No. 662,642. Patented Nov. 27, 1900.
A. W. GRANT.
DEVICE FOR EQUIPPING VEHICLE WHEELS WITH RUBBER TIRES.
(Application filed June 13, 1900.)
(No Model.)
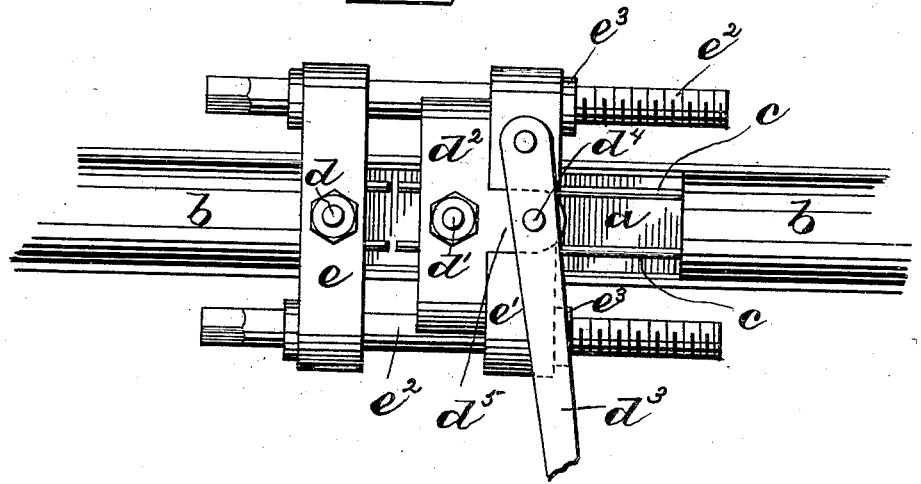
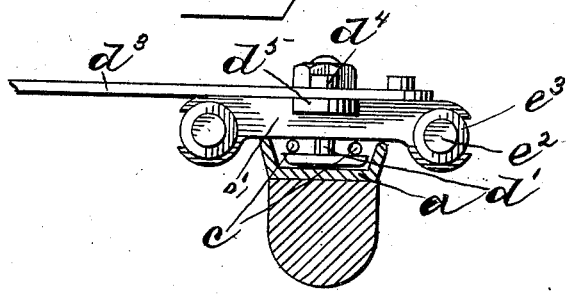 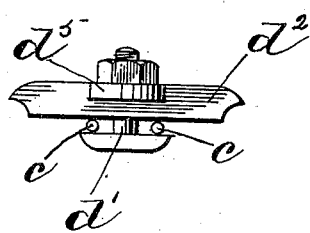
WITNESSES:
Frank L Walker
Chas. J. Welch
INVENTOR.
BY Arthur W Grant
ATTORNEY.

United States Patent Office.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY.

DEVICE FOR EQUIPPING VEHICLE-WHEELS WITH RUBBER TIRES.

SPECIFICATION forming part of Letters Patent No. 662,642, dated November 27, 1900.

Original application filed February 7, 1898, Serial No. 669,335. Divided and this application filed June 13, 1900. Serial No. 20,151. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for equipping vehicle-wheels with rubber tires, this application being Division C of my pending application, Serial No. 669,335, filed February 7, 1898.

My invention relates particularly to that class of rubber tires which are held on the peripheries of vehicle-wheels by an endless retaining band or bands which pass through the rubber, the rubber being seated in a groove or between flanges of a metallic rim which is secured to the wheel-rim in place of the ordinary band or tire.

The object of my invention is to provide a simple device for joining the ends of the retaining band or bands while the tire is within the channel or groove.

My invention consists of the constructions and combinations of parts hereinafter described, and set forth in the claims.

In the accompanying drawings, which form a part of this specification, Figure 1 is a plan view of the device showing my invention. Figs. 2 and 3 are detail views of the same.

Like parts are represented by similar letters of reference in the several views.

In equipping a wheel with rubber tires by my improved machine I take, preferably, though not necessarily, a single strip of rubber, through which is placed the retaining band or bands. The retaining band or bands are left sufficiently long to project through the ends of the strip thus formed. The rubber is then placed in the flanged groove of the wheel with the ends of the band or bands overlapping. The respective ends of the band or bands are then clamped in the jaws, one or both of which are movable with reference to the other, and these jaws or one of them are moved so as to tighten the retaining wires and cause them to bind the rubber tightly in the channel.

In said drawings, $a$ represents the grooved channel, $b$ the rubber therein, and $c$ the retaining-bands, of which two are preferably used, wire being a suitable material from which to form these bands. These bands are clamped by clamps $d$ and $d'$, the clamp $d$ being supported on a bar $e$ and the clamp $d'$ on an auxiliary support $d^2$, having a limited movement with reference to a bar $e'$, but adapted to normally move with said bar. Connecting-screws $e^2$ pass through one of these bars $e$ and engage threaded nuts $e^3$ in the other bar $e'$. The bar $e'$ is slotted at both ends, the slots being sufficiently wide to permit the screws $e^2$ to pass through. The screw-threaded nuts $e^3$ are separate from the bar $e'$ and are cone-shaped and fit in cone-shaped bearings in the bar, into which the slotted openings extend. This construction permits the bar $e'$ and its auxiliary support to be removed from and replaced upon the screws $e^2$ without running the nuts $e^3$ from said screws. By loosening the screws somewhat the bar $e'$ may be turned, so as to be freed from the screws. The lever $d^3$, pivoted on the bar $e'$ and engaging a pin $d^4$ on an extension $d^5$ of this auxiliary support $d^2$, furnishes the means for producing a limited movement of the clamp $d'$ with reference to the bar $e'$.

By turning the screws $e^2$, so as to cause the bars $e$ and $e'$ to approach each other, the bands may be drawn to any degree of tightness, the ends of the rubber resting against the respective bars. Inasmuch as the rubber is slightly longer than the periphery of the wheel the rubber will be compressed lengthwise as the wires are tightened, so as to draw the rubber into the channel, this compression being necessary to provide for the closing of the space at the point where the joint is made in the retaining-bands. When the bands have been sufficiently tightened, so as to secure the rubber firmly in the channel, the ends of the wires are cut off, so that their ends are adjacent to each other or butt up against each other, and when they are in proper condition the auxiliary support $d^2$ may through the medium of the lever $d^3$ be given the necessary movement to cause the ends of the wires or bands to be united by brazing, welding, or in any other suitable manner, after which the ends of the rubber are caused to approach each other to close the space in same. If electric welding is employed, it is obvious that one or both of the clamps should be insulated and the proper electrical connections made thereto to secure this result in a well-known manner.

Having thus described my invention, I claim—

1. The combination with the screws, of the cross-bars adapted to be moved to and from each other by said screws, band-holding clamps on one of said cross-bars, and an auxiliary support attached to the other bar and provided with a band-holding device, and means for securing a limited movement of said auxiliary support to cause the clamping devices to approach each other independent of said screws, substantially as specified.

2. The combination with the cross-bars having the clamping devices connected thereto, and means for adjusting said cross-bars to or from each other, an auxiliary support connected to one of said cross-bars, a pivoted lever also on said cross-bar and pivotally connected to said auxiliary support, and clamping devices on said auxiliary support, substantially as specified.

3. In a tire-machine, the combination of cross-bars having clamping devices adapted to extend into the channel of the wheel and engage the bands extending through the tire therein, means for moving said bars to or from each other, and an auxiliary support for one of said clamping devices to permit a limited movement of said clamping devices independent of the movement of said bars, substantially as specified.

In testimony whereof I have hereunto set my hand this 9th day of June, A. D. 1900.

ARTHUR W. GRANT.

Witnesses:
CHAS. I. WELCH,
EDMOND J. OGDEN.